United States Patent Office 3,476,417
Patented Nov. 4, 1969

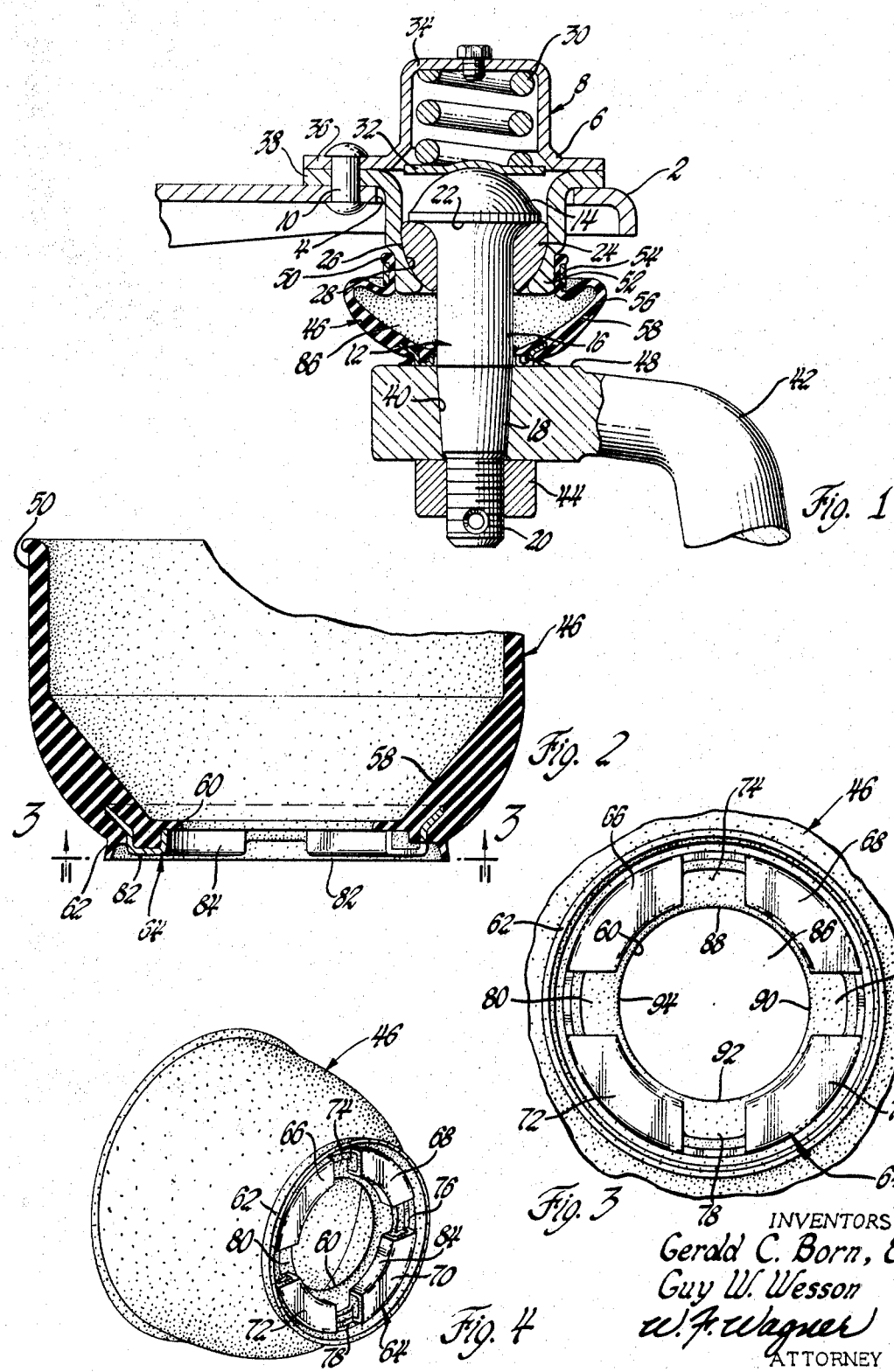

3,476,417
LUBRICANT PURGING SEALED BALL JOINT ASSEMBLY
Gerald C. Born, Reese, and Guy W. Wesson, Frankenmuth, Mich., assignors to General Motors Corporation, Detroit, Mich., a corporation of Delaware
Filed Oct. 25, 1966, Ser. No. 589,355
Int. Cl. F16c 11/06; F16b 7/00; B25g 3/38
U.S. Cl. 287—87                                   4 Claims

ABSTRACT OF THE DISCLOSURE

A ball joint assembly having a boot seal including a circumferentially segmented bearing ring embracing the stud portion of the joint, with one portion of the boot forming a radially displaceable sphincter seal axially adjacent the bearing ring and another portion of the boot forming a radially displaceable lip seal engageable with a surface normal to the axis of the stud.

---

This invention relates to ball joint assemblies and more particularly to permanently lubricated assemblies of the type adapted for use in vehicle suspension.

The present invention is concerned primarily with improvements in ball joint assemblies of the type disclosed in copending application Ser. No. 321,137, and now Patent No. 3,391,952 Philip B. Zeigler, entitled "Lubricant Purging Sealed Ball Joint Assembly," assigned to General Motors Corporation.

In the indicated application, a ball joint assembly is disclosed in which a boot seal is arranged in cooperating relationship with a snap-in segmental plastic bearing ring which surrounds the stud of the joint assembly and abuts the member to which the stud is attached. The boot seal includes a flexible flared skirt disposed radially outwardly of the bearing ring which is normally biased into sealing relation with the supporting member so as to prevent entrance of external contaminants into the assembly and yet allow dissipation of lubricant from the assembly when the pressure therein becomes excessive.

The present invention encompasses means for improving the sealing efficiency of assemblies of this general type while further simplifying the construction thereof.

The foregoing and other objects, advantages and features of the invention will become more readily apparent as reference is had to the accompanying specification and drawing wherein:

FIGURE 1 is an enlarged fragmentary elevational view, partly in section, illustrating a ball joint assembly embodying the invention and showing the relation thereof with associated parts of a vehicle suspension;

FIGURE 2 is a greatly enlarged fragmentary sectional elevational view illustrating the form and arrangement of seal means for the assembly in accordance with the invention;

FIGURE 3 is a view looking in the direction of arrows 3—3 of FIGURE 2; and

FIGURE 4 is a perspective view of the flexible boot assembly shown in FIGURE 1.

Referring now to the drawing and particularly FIGURE 1, there is shown a portion of a vehicle suspension in which the reference numeral 2 designates the outer extremity of the upper control arm of a conventional suspension linkage. Formed in the outer extremity 2 is an eye or opening 4 which surrounds the socket portion 6 of a ball joint assembly 8. Socket portion 6 includes a flange which abuts the upper surface of arm 2 and is secured thereto by rivets 10. Assembly 8 includes a ball stud 12 having upper parti-spherical head portion 14, an intermediate cylindrical shank portion 16, a lower tapered portion 18, and a threaded end portion 20. Surrounding shank portion 16 and abutting the thrust surface 22 of head portion 14 is a sintered metal parti-spherical bearing ring 24. The outer semi-spherical surface 26 of ring 24 engages a corresponding semi-spherical inner wall portion 28 formed in the lower half of socket 6. Stud 12 and bearing ring 24 are maintained in operating relationship with socket 6 by a coil spring 30 disposed in compression between bearing plate 32 and the top wall 34 of the upper portion of socket 6. Flanges 36 and 38 of the mating halves of socket 6 are secured together by welding to provide a leak proof juncture therebetween.

The tapered portion 18 of stud 12 in turn extends into a corresponding tapered bore 40 formed in the horizontally extending upper end of a wheel knuckle support 42 and is drawn into locking engagement therewith by nut 44 which threadably engages the threaded end 20.

According to the general features of the invention, an annular elastomeric boot 46 is disposed between the lower end of socket 6 and the upper face 48 of wheel knuckle 42 in surrounding relation with shank portion 16. As seen in FIGURE 1, the upper end 50 of boot 46 surrounds a reduced diameter pilot portion 52 on the lower end of socket 6 and is clamped in fluid tight relationship therewith by an encircling band 54. As seen best in FIGURE 4, prior to assembly, boot 46 assumes a generally cylindrical configuration, the axial length of which is considerably in excess of the vertical distance between the pilot portion 52 and face 48. However, when the stud 12 is secured to wheel knuckle 42 in the assembled relation shown in FIGURE 1, the cylindrical wall of the boot is axially deformed into an accordion-like convolution 56 which exerts substantial axial pressure urging the lower end of the boot into firm abutting engagement with face 48 of knuckle 42 irrespective of changes in relative angular displacement which normally takes place between control arm 2 and knuckle 42 during the vertical deflection of the suspension.

According to one feature of the invention, the lower portion 58 of boot 46 gradually increases in cross section and turns radially inwardly. At its lower terminus, portion 58 is formed with a radially inwardly extending circumferential bead-like lip 60 and a downwardly and outwardly inclined circumferential skirt-like lip 62. Molded into the portion 58 of boot 46 radially inwardly of skirt-like lip 62 and immediately axially below bead-like lip 60 is an annular sheet metal bearing ring 64. Ring 64 includes an outer continuous conical flange merging with an inner U-section ring portion segmented into four semi-circular sections 66, 68, 70 and 72 having radially and axially directed slots 74, 76, 78 and 80 formed therebetween. The segmental portions 66, 68, 70 and 72 form a lower common bearing surface 82 which bears against the surface 48 of knuckle 42 and a radially inwardly facing common bearing surface 84 which closely surrounds stud portion 16. Thus, while maintaining precision bearing engagement with both the surface 48 and the stud portion 16, bearing ring 64 permits movement of lubricant contained within the ball joint assembly outwardly through the slots 74, 76, 78 and 80. However, according to the principal feature of the invention, flow of lubricant from the internal cavity 86 is controlled by a two-stage sealing action provided by the bead-like lip 60 and skirt-like lip 62. It will be evident from FIGURE 2 that bead lip 60 prior to assembly defines an inside diameter significantly less than the outside diameter defined by stud 16. Accordingly, bead lip 60 is radially outwardly compressed as an incidence of assembly and, therefore, acts as a sphincter seal resisting displacement of lubricant from cavity 86 until significant pressure is built up therein. With the onset of the predetermined pressure required, one or more of portions 88, 90, 92 and 94 of bead lip 60 are displaced axially and radially to provide a clearance around stud 16 vertically adjacent the slots 74, 76, 78 and 80 permitting emission of lubricant therethrough and radially outwardly against skirt-like lip 62. Lip 62 in turn yields to such pressure by deflecting angularly upwardly and outwardly away from the surface 48. As soon as excessive pressure within cavity 86 has been relieved, skirt-like lip 62 responding to elastic memory returns to form a marginal lip seal with surface 48 and bead lip 60 responding to similar elastic memory resumes its normal embracing relationship with stud 16. It will, of course, be apparent that lip 62 due to its angular orientation with surface 48 while yielding to pressure from within the assembly to permit exit of lubricant, will react to externally originating pressure by exerting an increasing sealing force against surface 48, as a consequence of which the possibility of entrance of externally originating contamination is virtually precluded. By utilizing the two-stage seal disclosed, it will be seen that significantly enhanced sealing efficiency is achieved since discharge of lubricant is essentially controlled by the sphincter action of bead lip 60 which is remotely located with respect to possible contaminants. Further, entrance of contaminants is resisted not only by the skirt-like lip 62, but also by the barrier established by lip 60.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:
1. A lubricant purging sealed ball joint assembly comprising, an apertured socket, a ball stud tiltable and rotatable in said socket including a shank portion extending through said socket, a knuckle member secured to said shank portion including a bearing surface lying in a plane normal to the axis of said shank, a flexible annular boot surrounding said shank and extending between said socket and bearing surface, means connecting one end of said seal in surrounding engagement with said socket, means forming a reduced diameter bearing portion at the other end of said seal adapted for simultaneous interrupted bearing engagement with said shank and said bearing surface, means forming a first flexible sealing margin on said boot continuously engaging said shank for 360° about its circumference axially adjacent said bearing portion, and means forming a second flexible sealing margin on said boot continuously engaging said bearing surface radially adjacent said bearing portion.

2. The structure set forth in claim 1 wherein said bearing portion comprises a segmental ring molded in said boot having an inside diameter embracing said stud and an end face abutting said bearing surface.

3. The structure set forth in claim 2 wherein said first sealing margin comprises a homogeneous extension of said boot forming a circumferentially radially inwardly directed lip having a relaxed diameter smaller than the diameter of said shank and said second sealing margin comprises a homogeneous extension of said boot forming an inclined circumferential lip having an outer margin extending axially beyond said segmental bearing ring in relaxed condition.

4. The structure set forth in claim 3 wherein the portions of said first sealing lip disposed in alternating relation with the segments of said segmental ring are radially displaceable from said shank responsive to expansion of lubricant within said assembly and said second sealing lip is displaceable axially from said bearing surface responsive to passage of lubricant through said first sealing lip.

References Cited
UNITED STATES PATENTS

| | | |
|---|---|---|
| 3,175,834 | 3/1965 | Wallace et al. _____ 287—87 XR |
| 3,248,955 | 5/1966 | Templeton. |
| 3,262,706 | 7/1966 | Hassan. |

FOREIGN PATENTS

| | | |
|---|---|---|
| 1,014,147 | 12/1965 | Great Britain. |

DAVID J. WILLIAMOWSKY, Primary Examiner

A. V. KUNDRAT, Assistant Examiner

U.S. Cl. X.R.

277—212